United States Patent [19]

Sasaki

[11] Patent Number: 5,134,534

[45] Date of Patent: Jul. 28, 1992

[54] THIN-FILM MAGNETIC HEAD WITH ENHANCED CROSSTALK REDUCTION

[75] Inventor: Toyoshige Sasaki, Kanagawa, Japan

[73] Assignee: Canon Kabushiki Kaisha, Tokyo, Japan

[21] Appl. No.: 489,219

[22] Filed: Mar. 6, 1990

[30] Foreign Application Priority Data

Mar. 13, 1989 [JP] Japan ................................. 1-057877

[51] Int. Cl.⁵ ......................... G11B 5/147; G11B 5/17
[52] U.S. Cl. .................................... 360/126; 360/124; 360/128
[58] Field of Search ................. 360/126, 128, 121, 124

[56] References Cited

U.S. PATENT DOCUMENTS 4,901,178  2/1990  Kobayashi .......................... 360/126

Primary Examiner—A. J. Heinz
Attorney, Agent, or Firm—Robin, Blecker, Daley & Driscoll

[57] ABSTRACT

In a thin-film magnetic head including a magnetic circuit which is composed of upper and lower magnetic layers and a coil made of a conductive layer, a magnetic shield layer made of a conductive material is provided on the upper magnetic layer; and the intensity of the magnetic reluctance of the magnetic shielding action of the magnetic shield layer is arranged to be adjustable.

17 Claims, 10 Drawing Sheets

THIN-FILM MAGNETIC HEAD WITH ENHANCED CROSSTALK REDUCTION

BACKGROUND OF THE INVENTION

1. Field of the Invention

This invention relates to a thin-film magnetic head and more particularly to a thin-film magnetic head which has, on a substrate, a magnetic circuit consisting of upper and lower magnetic layers and a coil formed by a conductive layer and is provided with a magnetic shield layer.

2. Description of the Related Art

The thin-film magnetic head of the above-stated type is used for a magnetic disc device which is employed, for example, by an electronic camera and particularly for a magnetic disc device of the kind arranged to record and reproduce signals with a high degree of density. Spacing between recording tracks to be formed by the thin-film magnetic head on the magnetic disc device of this kind tends to become narrow because of a number of channels increased for shorter access time and also because of a demand for a higher degree of density. For example, the thin-film magnetic head employed in an electronic camera has been arranged to record one frame amount of a video signal in two channels in an analog manner. Whereas, in order to record a digital video signal or to perform high-definition image recording in a manner different from the conventional method, it is necessary to arrange a thin-film magnetic head to give a higher degree of track density and a greater number of channels.

FIGS. 1 and 2 show the arrangement of a typical multi-channel thin-film magnetic head, which is a three-channel head in this case. Referring to FIGS. 1 and 2, a substrate 1 is made of a non-magnetic material such as SiO₂ or a ferromagnetic material such as ferrite. Thin-film magnetic head forming members are deposited on the substrate 1 in thin filmy states by photolithography.

A lower magnetic layer 2 is first provided in common for all channels over the whole upper surface of the substrate 1. The lower magnetic layer 2 is formed in the form of a thin film with a ferromagnetic material which is of a high-saturation magnetic flux density such as a Fe-Al-Si system alloy (called Sendust).

Coils 4 which are made of such a material as Cu or Al are disposed on the lower magnetic layer 2 through an insulation layer 7 which is a double layer. In this case, three coils 4 are arranged in parallel in the direction of track width for three channels 21 to 23.

An upper magnetic layer 3 is formed on each of the coils 4 through the insulation layer 7. These upper magnetic layers 3 are also made of a ferromagnetic material which is similar to the material of the lower magnetic layer 2. A magnetic circuit is formed by each of the upper magnetic layers 3 in conjunction with the lower magnetic layer 2 for a thin-film magnetic head. The upper magnetic layers 3 are arranged to straddle the respective coils 4. The fore end part of each of the upper magnetic layers 3 is opposed to the lower magnetic layer 2 via a magnetic gap 5. The rear end part of the upper magnetic layer 3 is brought into contact with the lower magnetic layer 2 at a contact part 6.

An insulation layer (not shown) is arranged to cover, for protection, the whole arrangement described above.

With the multi-channel thin-film magnetic head arranged in this manner, information is magnetically recorded or reproduced by causing the right-hand side of the head, as viewed on FIGS. 1 and 2, to come into sliding contact with the surface of a magnetic disc which is not shown. In recording, the magnetic disc is magnetized with a recording magnetic field generated at the magnetic gap 5 by allowing a recording signal current to flow to the coil 4. In reproducing, a magnetic flux is generated from a magnetized part of the magnetic disc located near the magnetic gap 5. The magnetic flux comes to be interlinked with the coil 4 passing through a magnetic path formed by the upper magnetic layer 3, the contact part 6 and the lower magnetic layer 2. A signal voltage is induced at the coil 4 as this magnetic flux varies according to the movement of the disc. The signal voltage which is thus induced is taken out as a reproduced signal.

In the above-stated multi-channel thin-film magnetic head, either the recording track width must be narrowed while leaving a spacing distance between the magnetic gaps 5 of the head as it is, or the distance between channels must be narrowed, in order to increase the recording track density. However, the narrowed track width does not give a sufficient reproduction output or makes tracking control difficult. Further, the narrowed distance between channels increases a crosstalk due to a magnetic flux leakage occurring between the channels.

The crosstalk problem is as follows: The magnetic flux leakage from a channel currently used for reproduction enters an adjoining channel to cause a noise by being interlinked with the coil. This problem must be solved in order to further increase the track density in the future.

Referring to FIGS. 3, 4 and 5 which show the flow of the magnetic flux, the generation of the crosstalk during reproduction is described in detail as follows:

FIG. 3 shows the flow of the magnetic flux of a first channel 21 which is assumed to be currently under a signal reproducing operation. A magnetic flux 49 which is generated from the magnetic recording medium enters the head from the sliding surface of the upper magnetic layer 3. The magnetic flux 49 comes to be interlinked with the coil 4 through a magnetic path formed by the upper magnetic layer 3, the contact part 6 and the lower magnetic layer 2. At that time, a part of the magnetic flux 49 passing the upper magnetic layer 3 leaks and comes into the upper magnetic layer of the adjoining second channel 22.

FIG. 4 shows the lower magnetic layer 2 as viewed from above. The position of each upper magnetic layer 3 is indicated by a broken line. Each contact part 6 is indicated by hatching. A magnetic flux 51 which comes from the upper magnetic layer 3 and the contact part 6 of the first channel 21 which is currently in the reproducing operation spreads to a great degree within the lower magnetic layer 2 as indicated by arrows before it comes back to the magnetic recording medium. Then, a part of the spread magnetic flux 51 flows to the lower magnetic layer 2 of the adjoining second channel 22.

FIG. 5 shows the magnetic flux flowing to the adjoining second channel 22. A magnetic flux 50 which leaks from the upper magnetic layer 3 of the first channel 21 and comes to intrude into the upper magnetic layer 3 of the adjoining second channel 22 forks into two flows near the magnetic gap 5 of the upper magnetic layer 3. One magnetic flux leak flow comes to the magnetic gap 5 and the other to the contact part 6. The magnetic flux 50 flowing to the contact part 6 comes back to the magnetic recording medium via the lower magnetic layer 2. Further, the magnetic flux 51 which comes from the first channel 21 and passes through the lower magnetic layer 2 spreads once toward the upper magnetic layer 3 at the contact part 6 and, after that, comes back to the magnetic recording medium through the lower magnetic layer 2. As a result of these magnetic flux flows, the part of the magnetic flux 50 which has intruded from the upper magnetic layer 3 and passed through the contact part 6 is interlinked with the coil 4 to induce a voltage. This brings about a crosstalk.

To lessen the crosstalk which is generated in the above-stated manner, practice has been to reduce the intruding magnetic flux leak by shortening the length of the upper magnetic layers 3 of the adjacent channels in such a way as to lessen their confronting areas.

This method, however, makes a coil winding space for the coil 4 too small. The coil must have a certain amount of sectional area for enduring a recording current. Hence, the narrow coil winding space results in a less number of turns of the coil which hardly gives a sufficient reproduction output. Further, coil winding within the narrow space makes the manufacture of the head difficult and thus results in a poor yield of production.

Another solution of the crosstalk problem has been proposed. In accordance with that solution, a slit is provided in the lower magnetic layer 2 between adjacent channels. The slit thus divides the lower magnetic layer 2, so that the magnetic flux leak from one channel can be prevented from intruding into another.

That solution, however, necessitates a photolithographic etching process on the lower magnetic layer 2 which measures several $\mu$m to scores of $\mu$m in thickness. The etching process is difficult and takes time. Further, in this instance, the crosstalk depends greatly on the width of the slit. The crosstalk characteristic thus tends to vary among products. Besides, the crosstalk characteristic has not been much improved by that method for all the manufacturing difficulty and high cost.

In a conceivable solution of the crosstalk problem, the thin-film magnetic head is arranged as follows: Referring to FIG. 6, a magnetic shield layer 9 which is made of an electrically conductive material such as Cu or Al is arranged to cover each of the upper magnetic layers 3 through a non-magnetic insulation layer which is not shown. With the head arranged in this manner, when the magnetic flux flowing to the upper magnetic layer 3 of a channel 21 increases to bring about a leak magnetic flux 50, the leak magnetic flux 50 tries to intrude into the upper magnetic layer 3 of the adjoining channel 22 as indicated by a broken-line arrow. Then, eddy currents 52 flow within the magnetic shield layer 9 as indicated by full-line arrows. The amount of the leak magnetic flux 50 intruding into the upper magnetic layer 3 is decreased by virtue of the eddy current 52, so that the crosstalk can be lessened.

In actuality, however, the crosstalk reducing effect of this method has been insufficient. The reason for this is as described below with reference to FIG. 7:

Referring to FIG. 7, the magnetic flux 50 which comes to intrude into the upper magnetic layer 3 from the adjoining channel is decreased by the magnetic shield layer 9 as stated above. However, the decrease causes another magnetic flux 51 which comes through the lower magnetic layer 2 to spread upward at the contact part 6. As a result, a part of the magnetic flux 51 comes back to the magnetic recording medium through the upper magnetic layer 3 and the magnetic gap 5 along with the magnetic flux 50. The flow causes the magnetic flux 51 to be interlinked with the coil 4. This results in a crosstalk.

SUMMARY OF THE INVENTION

This invention is directed to the solution of the problems of the prior art described in the foregoing.

It is, therefore, an object of the invention to provide a thin-film magnetic head which is capable of effectively preventing noise generation due to a leak magnetic flux.

Under this object, a thin-film magnetic head arranged according to this invention as an embodiment thereof comprises: a magnetic circuit part which is composed of an upper magnetic layer, a lower magnetic layer and a magnetic gap; a coil which is made of an electrically conductive material and is disposed between the upper and lower magnetic layers; and a magnetic shield layer which is disposed on the upper magnetic layer and is made of an electrically conductive material, the amount of the reluctance of said magnetic shied layer being arranged to be externally adjustable.

A thin-film magnetic head which is arranged according to this invention as another embodiment thereof comprises: a magnetic circuit part which is composed of an upper magnetic layer, a lower magnetic layer and a magnetic gap; a coil which is disposed between the upper and lower magnetic layers and is made of an electrically conductive material; and a magnetic shield layer disposed on the upper magnetic layer and including an electrically conductive part which is formed in a lattice-like shape.

It is another object of the invention to provide a multi-channel thin-film magnetic head which has a plurality of magnetic circuits arranged in parallel and is capable of permitting an increase in track density and effectively preventing a crosstalk between channels.

Under that object, a thin-film magnetic head which is arranged as an embodiment of this invention comprises: a plurality of magnetic circuit parts, each of which is composed of an upper magnetic layer, a lower magnetic layer and a magnetic gap, the lower magnetic layer being provided in common for all the plurality of magnetic circuit parts; coils each of which is made of an electrically conductive material and is disposed between the upper magnetic layer and the lower magnetic layer in each of the plurality of magnetic circuit parts; and a magnetic shield layer which is provided for each of the plurality of magnetic circuits and is disposed on the upper magnetic layer of each of the plurality of magnetic circuit parts, the magnetic shield layer being made of an electrically conductive material and having the amount of the reluctance arranged to be externally adjustable.

These and other objects and features of the invention will become apparent from the following detailed description of embodiments thereof taken in connection with the accompanying drawings.

DETAILED DESCRIPTION OF THE PREFERRED EMBODIMENTS

Figure 1:
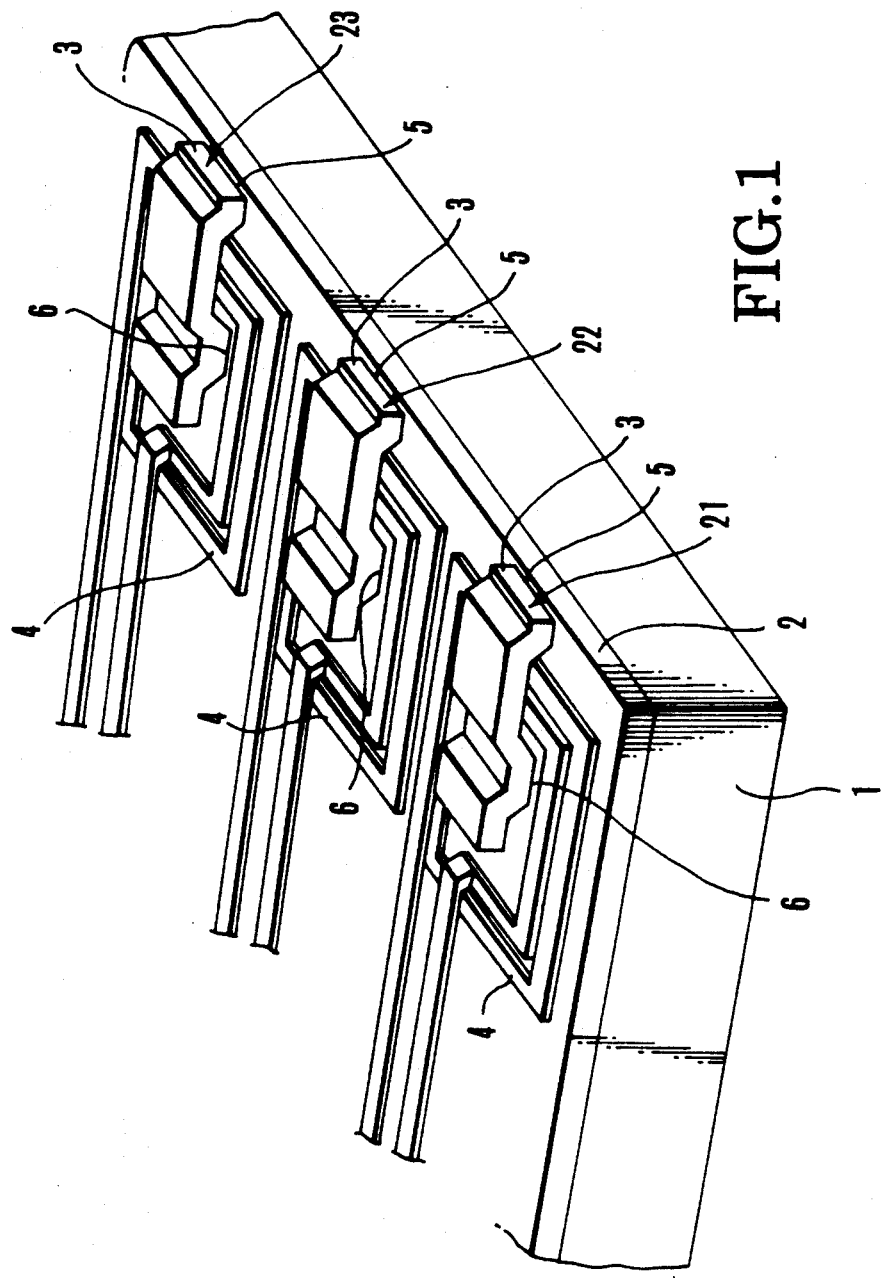
FIG. 1 is an oblique view showing the arrangement of essential parts of the conventional ordinary thin-film magnetic head.
Figure 2:
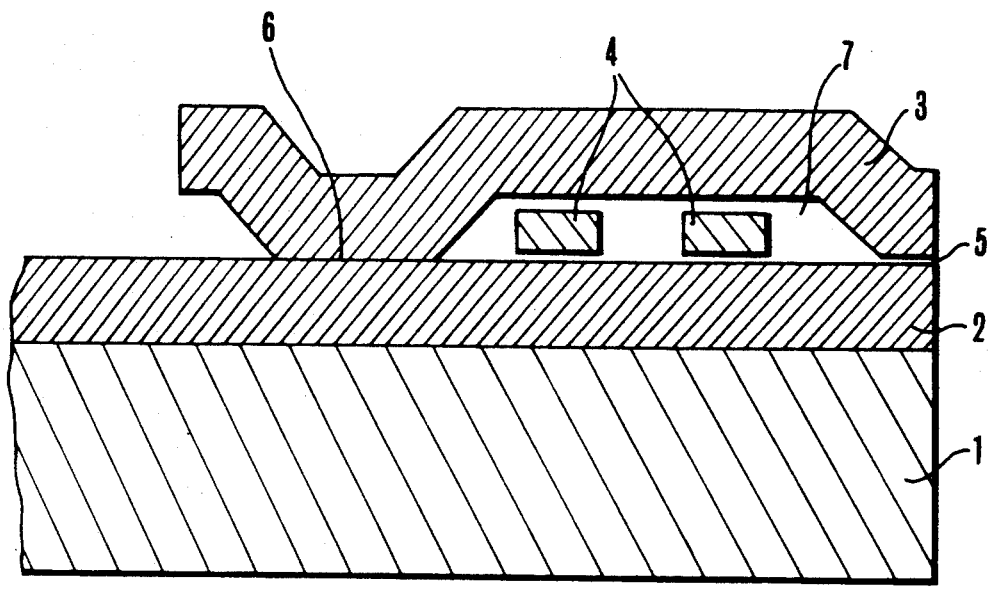
FIG. 2 is a sectional view of the thin-film magnetic head.
Figure 3:
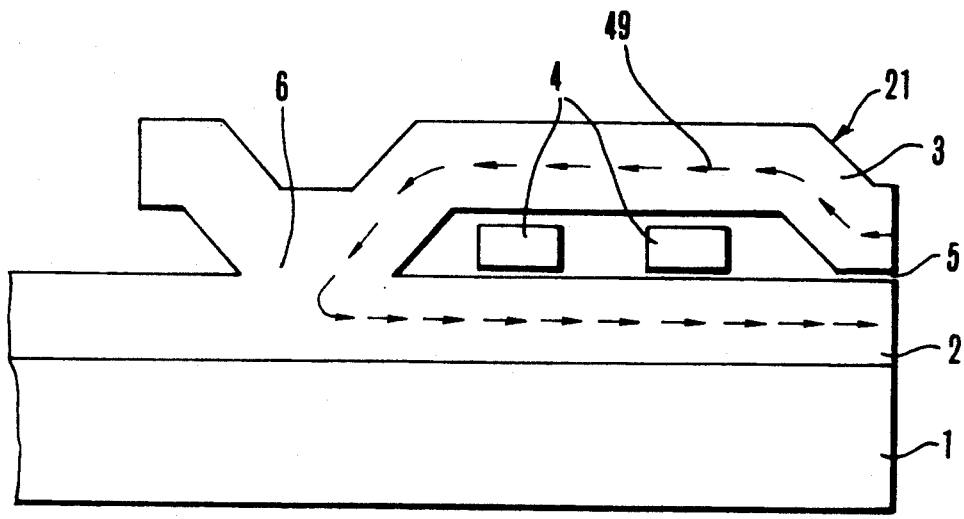
FIG. 3 is a sectional view showing the flow of a magnetic flux flowing during the reproducing operation of the thin-film magnetic head of FIGS. 1 and 2.
Figure 4:
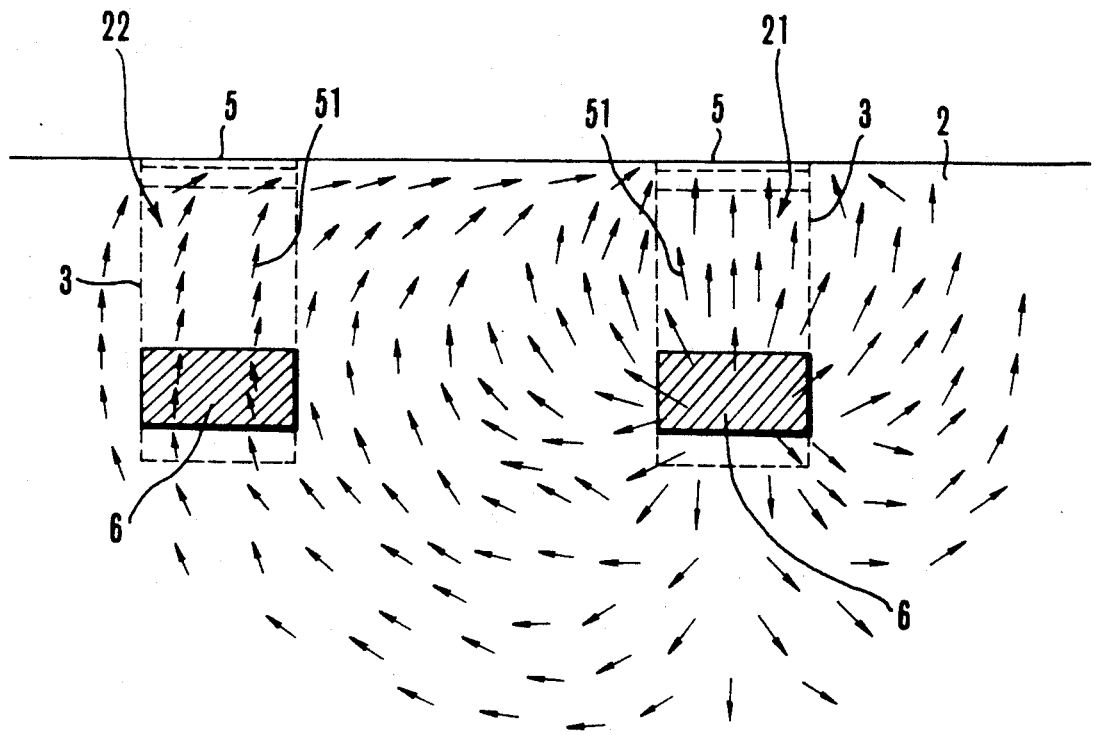
FIG. 4 is a plan view showing the magnetic flux flow of the thin-film magnetic head shown in FIGS. 1 and 2.
Figure 5:
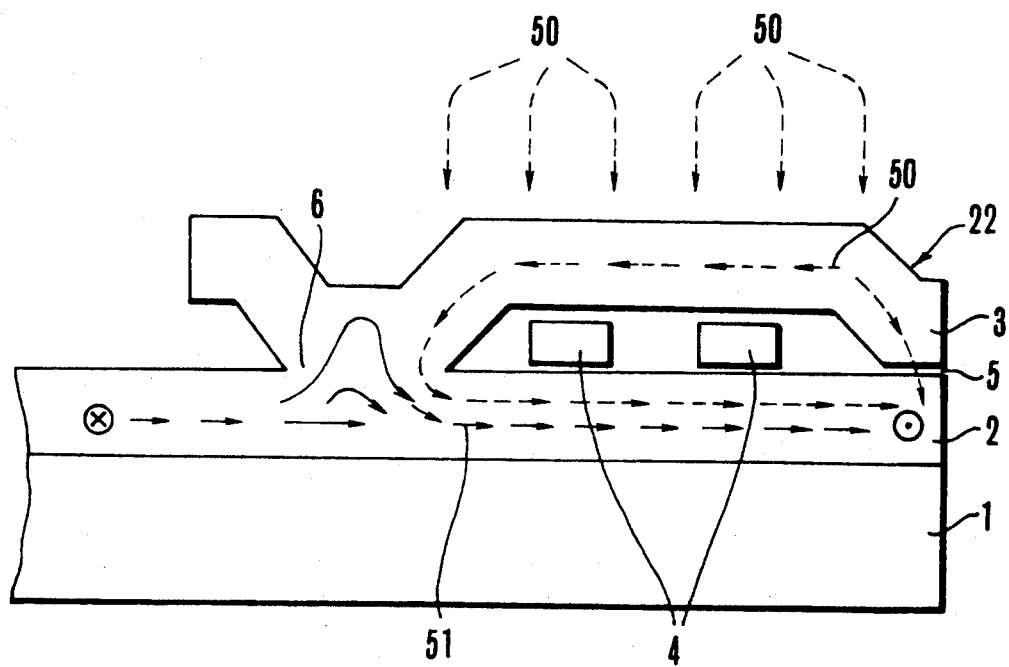
FIG. 5 shows the thin-film magnetic head of FIGS. 1 and 2 as in a state of generating a crosstalk.

The following describes by way of example the details of embodiments of this invention with reference to drawings. In these cases, the invention is applied to multi-channel thin-film magnetic heads which are of the same type as the example of the conventional head described in the foregoing. In the drawings showing the embodiments, the parts which are the same as or corresponding to the parts of the conventional head are indicated by the same reference numerals and the details of them are omitted from the following description.

First Embodiment

Figure 6:
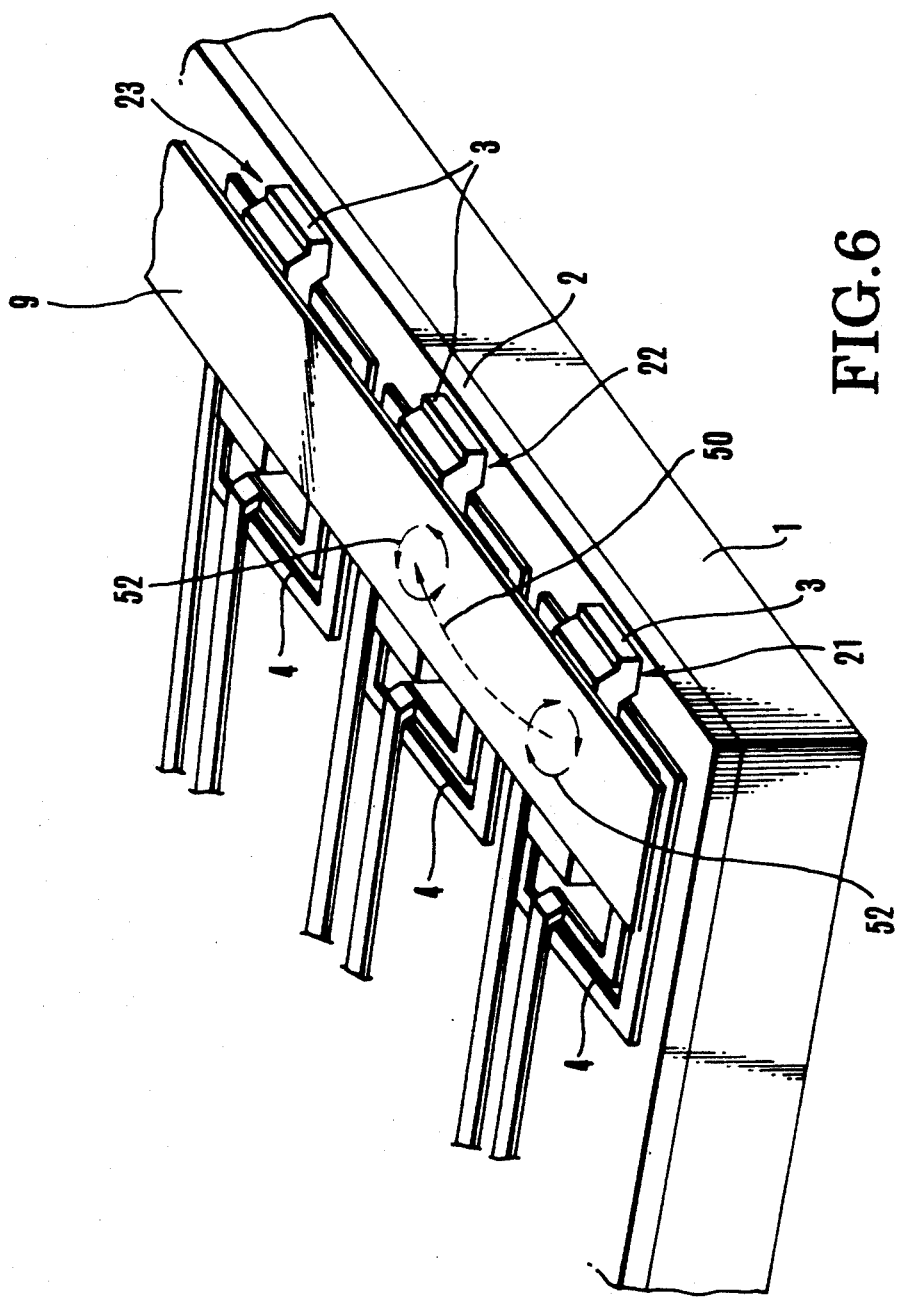
FIG. 6 shows the arrangement of a thin-film magnetic head which is provided with a magnetic shield layer.
Figure 8:
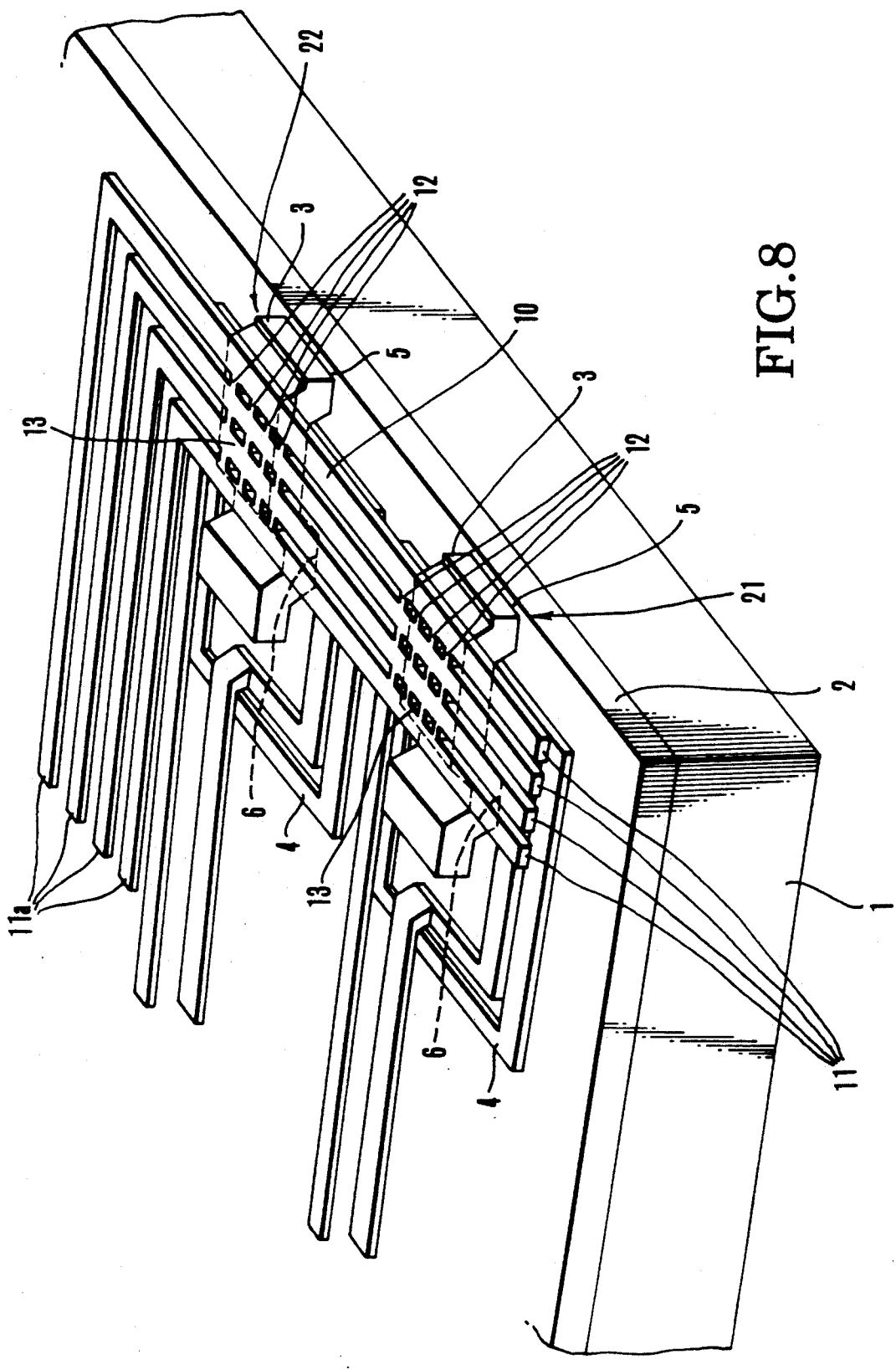
FIG. 8 is an oblique view showing the arrangement of a thin-film magnetic head which is arranged according, to this invention as a first embodiment thereof.

FIG. 8 shows the arrangement of essential parts of a thin-film magnetic head (having two channels) which is arranged according to this invention as a first embodiment thereof. As shown, in the case of the first embodiment, a magnetic shield layer 10 which is of a shape differing from the magnetic shield layer of FIG. 6 is provided over the upper magnetic layers 3. The magnetic shield layer 10 is made of an electrically conductive material and is disposed as a conductive layer above the upper magnetic layers 3 through a non-magnetic insulating layer which is not shown.

Figure 9:
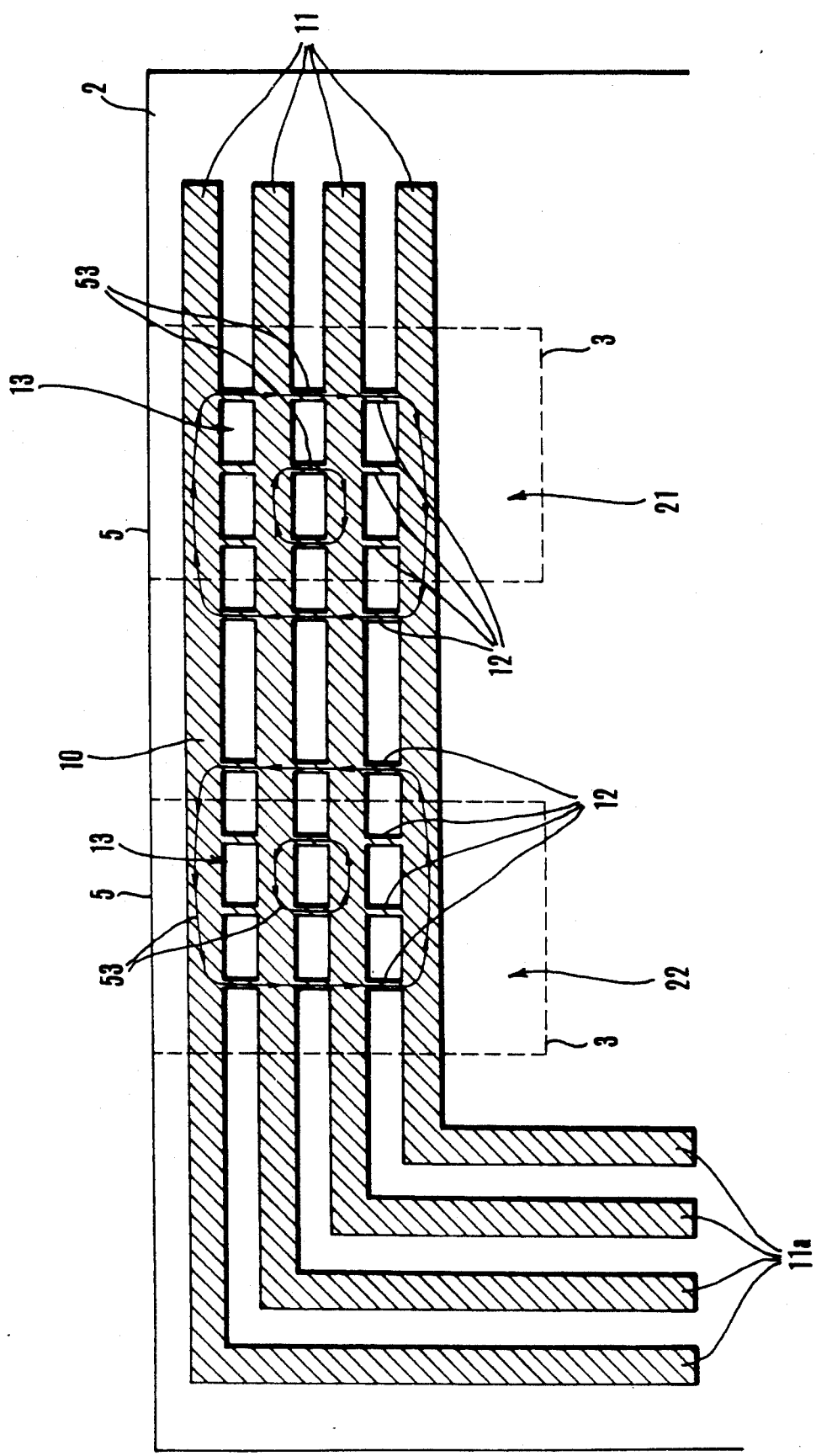
FIG. 9 is a top view showing the shape of a magnetic shield layer which is included in FIG. 8.

Referring to FIG. 9, the shape and arrangement of the magnetic shield layer 10 are as follows: As shown, the magnetic shield layer 10, in this instance, consists of four first lines 11 which are thick and eight second lines 12 which are thin and intersect the first lines 11. The first lines 11 are formed in parallel to each other and is disposed laterally as viewed on FIG. 9 above the two upper magnetic layers 3 in the direction of the track width of the magnetic gaps 5. The left end parts 11a of the first lines 11 which protrude on the left side of the upper magnetic layer 3 of the left-side channel 22 are bent in an L shape toward the rear part of the head.

Further, the second thin lines 12 are formed in parallel to each other to perpendicularly intersect the first lines 11 above the two upper magnetic layers 3 in the direction of the depth of the magnetic gaps 5. With the group of the first lines 11 and the group of the second lines 12 thus intersecting each other, two lattice-like meshy parts 13 are formed above the upper magnetic layers 3. Each of the meshy parts 13 is located in a position which deviates a little inward from a position just above the corresponding upper magnetic layer 3.

Further, the sectional area, in the direction of the gap depth, of each of the four lines 11 is arranged to be sufficiently larger than the total sum of the sectional areas, in the direction of the track width, of the eight lines 12.

The lines 12 are arranged in such a manner that, when a current is applied between two adjacent end parts 11a in the four lines 11, the parts of the lines 12 to which the current is applied are melted and broken by a Joule heat generated by the current. In other words, the magnetic shield layer 10 is made of such a material that can be readily fused and broken by the Joule heat.

With two of the four lines 11 thus selected, a current is applied between the two lines 11 to break the lines 12 between the two lines 11. This changes the path of the flow of an eddy current at each of the meshy parts 13, as will be further described later. The amount of reluctance due to the magnetic shielding action of the meshy part 13 of the magnetic shield layer 10 is thus adjustable by changing the path of the eddy current flow in this manner.

Figure 7:
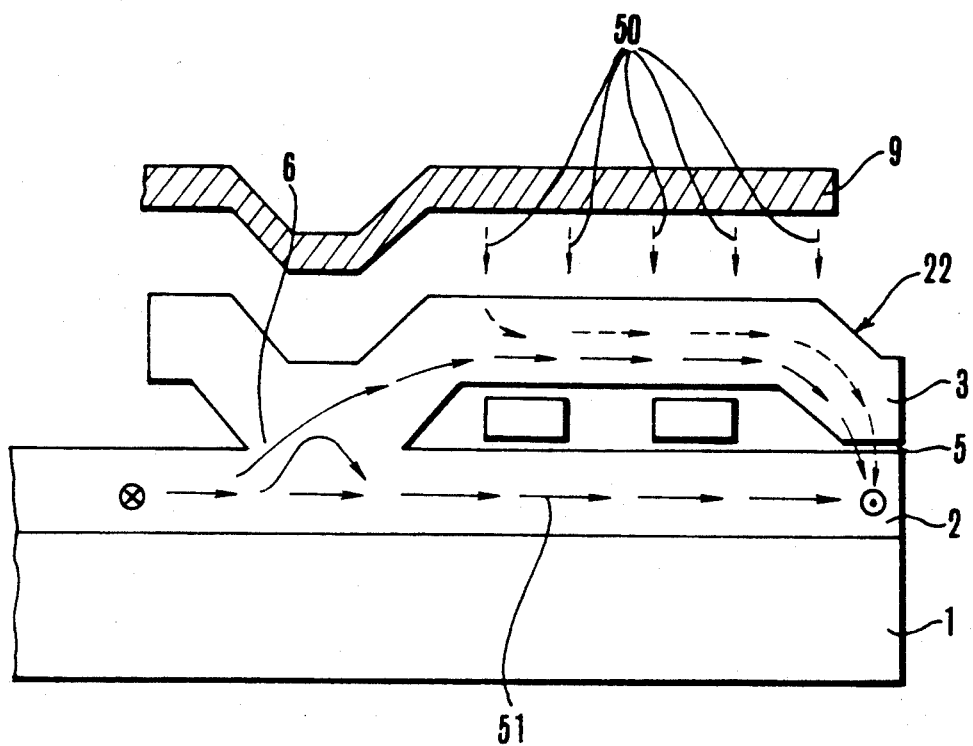
FIG. 7 is a sectional view showing the magnetic flux flow of the thin-film magnetic head of FIG. 6.

The embodiment which is arranged as described above operates in the following manner:

Under the condition as shown in FIG. 9, when a leak magnetic flux from one of the adjacent channels 21 and 22 attempts to intrude into the upper magnetic layer 3 of the other, eddy currents 53 flow at the meshy parts 13 of the magnetic shield layer 10 as indicated by full-line arrows. The intruding magnetic flux is decreased by virtue of the eddy current 53. However, if the condition is left as it is, the crosstalk characteristic cannot be much improved, like in the case of the conventional arrangement shown in FIGS. 6 and 7, because: The magnetic flux flowing from the adjoining channel to the lower magnetic layer 2 comes through the contact part 6 to the upper magnetic layer 3 to be interlinked with the coil 4.

Whereas, in the case of this embodiment, two of the end parts 11a of the four lines 11 are selected under the above-stated condition; a current is applied between the two of the four lines 11 thus selected; and the path of the eddy current 53 is changed by breaking the thin lines 12 between the two lines in the above-stated manner. This arrangement permits adjustment of the amount of magnetic reluctance of the meshy parts 13.

For example, when a current is allowed to flow between the first and second of the first lines 11 on the side of the magnetic gap 5 as viewed on FIG. 9, the lines 12 are broken between the first and second lines 11. The flowing path of the eddy current 53 then disappears between them. This decreases the flowing part of the eddy current 53. As a result, the intensity of the reluctance due to the whole magnetic shield provided by the magnetic shield layer 10 decreases. Further, with the sectional areas of the lines 11 and 12 set to be in the above-stated relation and also with the current set at a suitable value, the thick lines 11 can be prevented from being broken by the Joule heat when the current is applied for the purpose of breaking the thin lines 12.

The intensity of the reluctance due to the whole magnetic shield provided by the magnetic shied layer 10 can be reduced stepwise by breaking the thin lines 12 between the second and the third of the thick lines 11 and then between the third and fourth of the lines 11 by further applying a current between the second and third and then between the third and fourth of the four lines 11.

With the magnetic reluctance of the magnetic shield layer 10 suitably adjusted in this manner, the flow of a leak magnetic flux from one of the adjacent channels 21 and 22 into the other can be adjusted. A crosstalk between the two channels can be prevented by this adjustment through a mechanism which is shown by way of example in FIG. 10.

Figure 10:
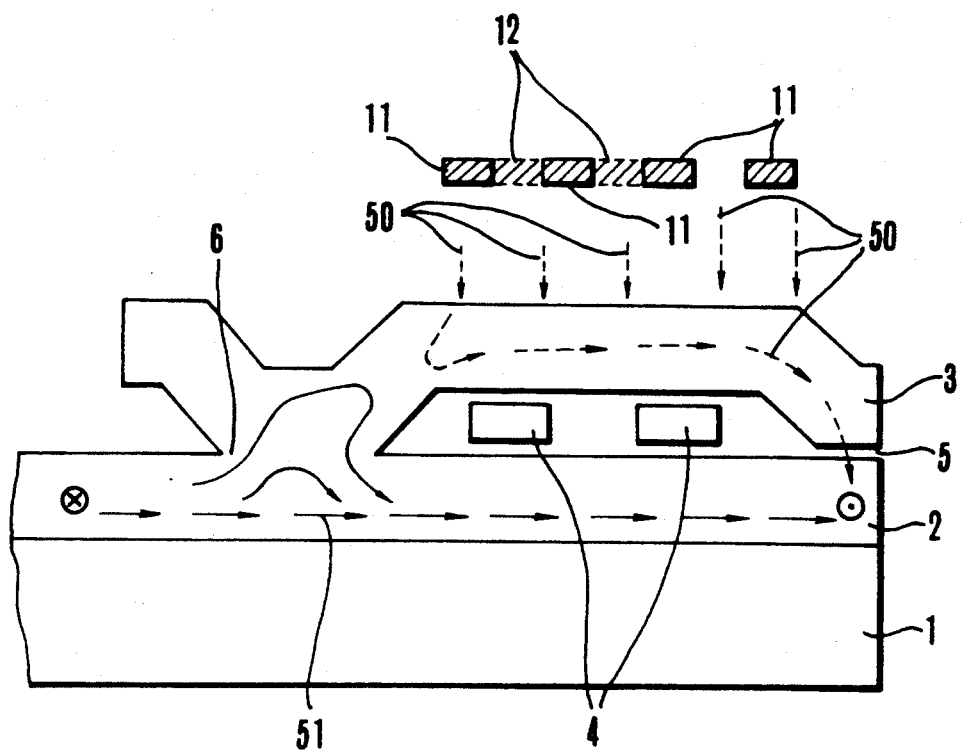
FIG. 10 is a sectional view showing the magnetic flux flow of the magnetic head of FIG. 8.

FIG. 10 shows the embodiment as in a state of having the lines 12 broken or cut off between the first and second of the first lines 11. Under this condition, a magnetic flux 50 intruding from the adjoining channel into the upper magnetic layer 3 of the channel which is shown in FIG. 10 as located beneath the meshy part 13 is small on the side of the contact part 6 and large on the side of the magnetic gap 5. As a result, the magnetic flux 50 intruding into the upper magnetic layer 3 tries to flow not only toward the gap 5 but also toward the contact part 6. This flow of the magnetic flux 50 counteracts and suppresses another magnetic flux 51 flowing toward the gap 5 through the upper magnetic layer 3 from the contact part 6 of the channel shown by coming from the adjoining channel through the lower magnetic layer 2.

As a result, the magnetic flux 50 intruding into the upper magnetic layer 3 shown from the adjoining channel almost wholly flows toward the magnetic gap 5. Meanwhile, the magnetic flux 51 which comes from the adjoining channel through the lower magnetic layer 2 comes back to the magnetic recording medium via the lower magnetic layer 2 after temporarily spreading upward at the contact part 6. Both the magnetic fluxes 50 and 51 eventually flow without being interlinked with the coil 4, so that generation of a crosstalk can be prevented.

In a case where a crosstalk still cannot be sufficiently reduced with the lines 12 cut in the manner as shown in FIG. 10, the lines 12 are cut further to further lessen the magnetic reluctance of the magnetic shield layer 10 in the manner as described in the foregoing for minimization of the crosstalk. In the drawings, the meshy parts 13 are depicted as in a state of having coarse meshes by reducing the number of the lines 11 and 12 for the sake of simple illustration. However, the magnetic reluctance of the magnetic shield layer 10 can be more finely adjusted stepwise for further reduction of the crosstalk by increasing the numbers of lines 11 and 12 to obtain finer meshes.

The first embodiment which is arranged in this manner is capable of effectively reducing the crosstalk by adjusting the magnetic reluctance due to the magnetic shield provided by the magnetic shield layer 10. The magnetic shield layer 10 can be easily formed by the currently available thin-film forming technique. The arrangement of the embodiment never makes the manufacturing processes complex and never deteriorates the yield of production.

Another advantage of the embodiment lies in that: Compared with the head having no magnetic shield, the embodiment gives a less amount of leaking magnetic fluxes, so that reproduction efficiency can be somewhat increased for a larger reproduction output.

A further advantage of the embodiment lies in that: Unlike the conventional head, its arrangement obviates the necessity of shortening the upper magnetic layer to make the coil winding space narrower for the purpose of preventing the crosstalk. This enables the coil to have a greater number of turns for a larger reproduction output. The manufacturing processes can be simplified and the yield of production can be increased.

While the head is described as having two channels for the sake of simplification of illustration, the same advantageous effects of the embodiment are of course attainable with the number of channels increased.

Further, the magnetic shield layer 10 of the first embodiment described is illustrated in a flat shape extending in parallel to the lower magnetic layer 2. In an actual application of the invention, however, the magnetic shield layer 10 does not have to be in the flat shape and may be arranged to have some raised and lowered parts according to the shapes of the component parts located beneath the layer 10 such as the shapes of the upper magnetic layer 3 and the coil 4. This applies also to second and third embodiments which will be described below:

Second Embodiment

Figure 11:
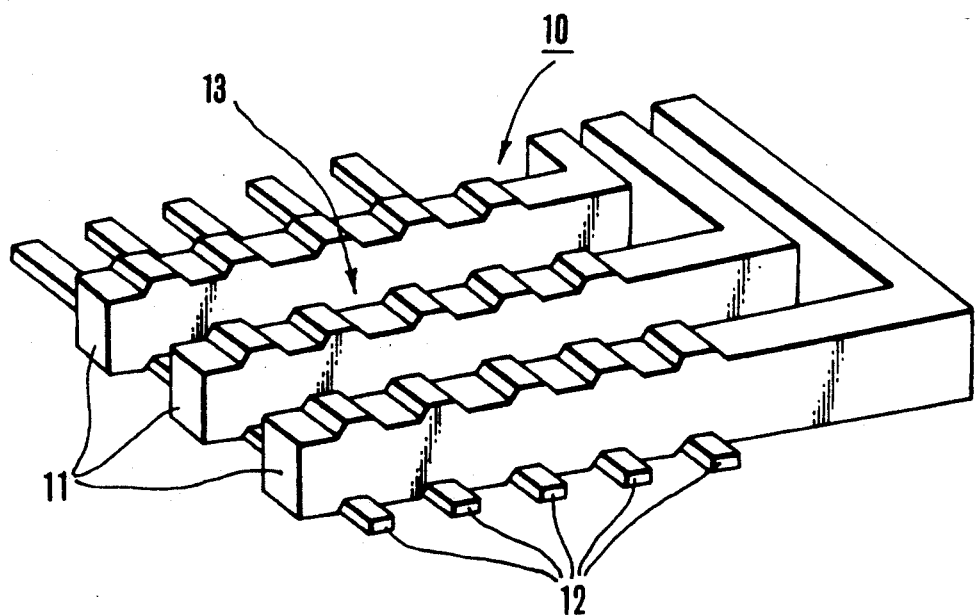
FIG. 11 is an oblique view showing the arrangement of a magnetic shield layer included in a thin-film magnetic head which is arranged according to this invention as a second embodiment thereof.

FIG. 11 shows the arrangement of a magnetic shield layer 10 which magnetically shields the upper magnetic layers, in the same manner as described in the foregoing, of a thin-film magnetic head arranged as a second embodiment of this invention. As shown in FIG. 11, the magnetic shield layer 10 of the second embodiment has first lines 11 formed separately from second lines 12. They are formed and disposed in a state of being overlapped in the direction of the thickness of the magnetic shield layer 10. In other words, the second lines 12 are first formed and the first lines 11 are arranged to overlap the second lines 12. This arrangement enables these lines 11 and 12 to differ in thickness from each other. Therefore, the above-stated relationship of the sectional areas of the lines 11 and 12 can easily be set, so that finer meshes of the meshy part 13 can easily be formed. Thus, the above-stated adjustment of the magnetic reluctance can be effected more finely in a great number of steps, and the crosstalk can more effectively be prevented.

Further, according to the present embodiment, the lines 11 and 12 may be made of different materials. The lines 11 are made of a material which has a higher electric conductivity and a higher melting point than the material of the lines 12. This ensures that the lines 12 can be more reliably cut off when a wire breaking current is applied in the manner described in the foregoing. Therefore, the magnetic reluctance can be more reliably adjusted to ensure an improvement in crosstalk reducing characteristic.

Third Embodiment

Figure 12:
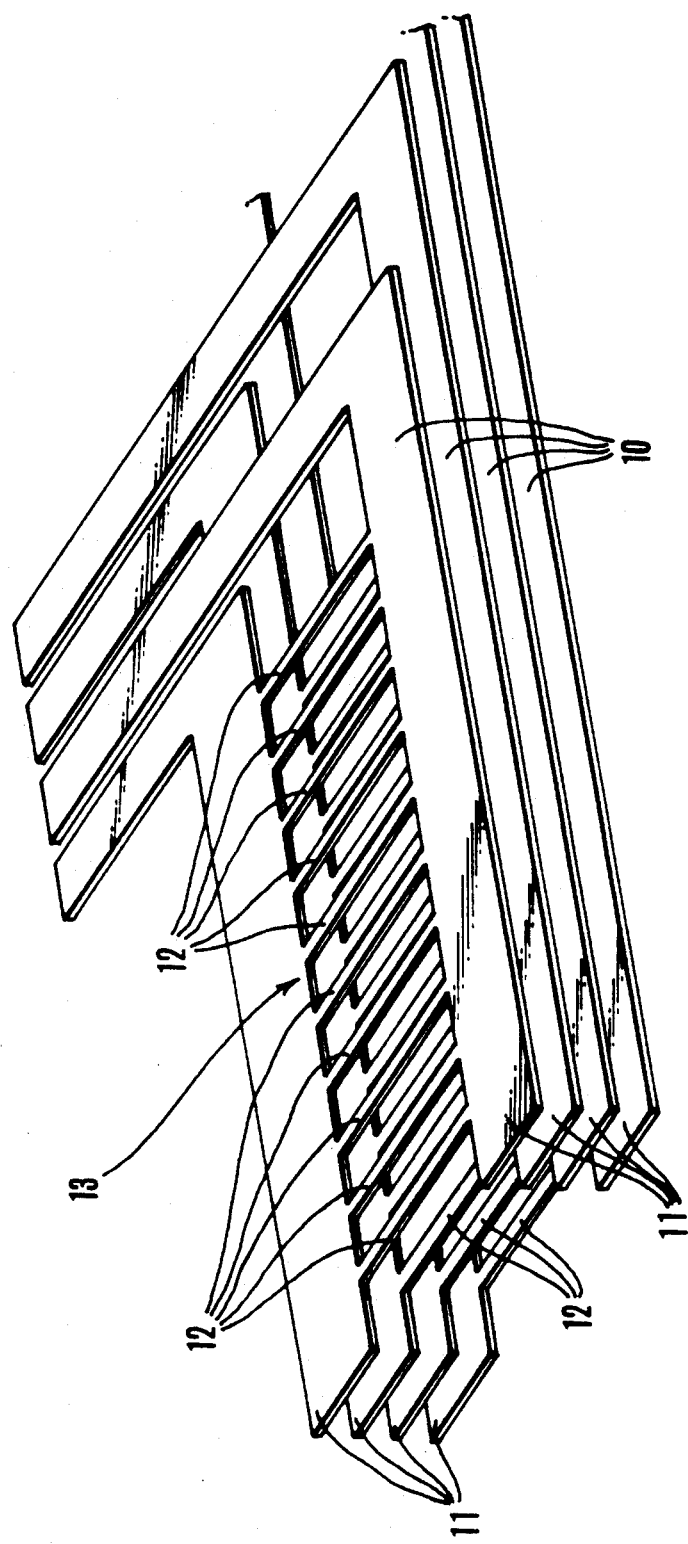
FIG. 12 is an oblique view showing the arrangement of a magnetic shield layer included in a thin-film magnetic head which is arranged according to this invention as a third embodiment thereof.

FIG. 12 shows the structural arrangement of the magnetic shield layer 10 of a third embodiment of the invention. In this case, a laminated magnetic shield layer 10 is formed to be thinner than in the cases of the first and second embodiments. The laminated layer 10 consists of a plurality of (four in this case) layers which are arranged in a laminated state above the upper magnetic layers through an insulation layer which is not shown. Each magnetic shield layer 10 is arranged to have two thick lines 11 with a plurality (10 in this case) of thin lines 12 formed in parallel between the two thick lines 11 in such a way as to form a meshy part 13.

In the case of the third embodiment, one of the plurality of magnetic shield layers 10 is selected. A current is applied between the two lines 11 of the selected magnetic shield layer 10 in such a way as to vary the magnetic reluctance of the magnetic shield by breaking (or cutting off) the lines 12 by Joule heat between the two lines 11. The intensity of the magnetic reluctance is adjustable stepwise by changing the number of the magnetic shield layers 10 to be subjected to the line (wire) breaking process. The magnetic reluctance is of course more finely adjustable with the number of adjustment steps increased by increasing the number of the magnetic shield layers 10.

Each of the magnetic shield layers 10 being individually in a simpler shape than in the case of the first and second embodiments, the process of forming it is simple to ensure an improved yield rate of production.

Figure 13A:
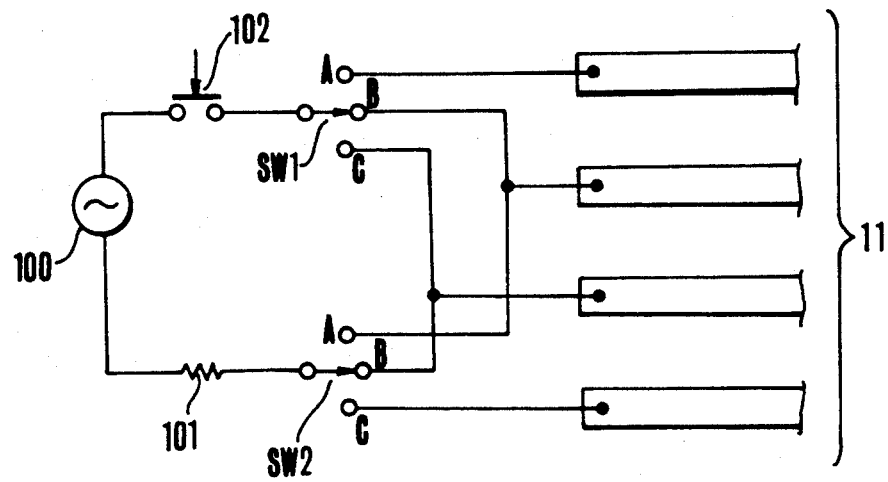
FIGS. 13(A) and 13(B) are circuit diagram showing circuits arranged to cause a current to flow to the magnetic shield layer of the first embodiment shown in FIG. 8.
Figure 13B:
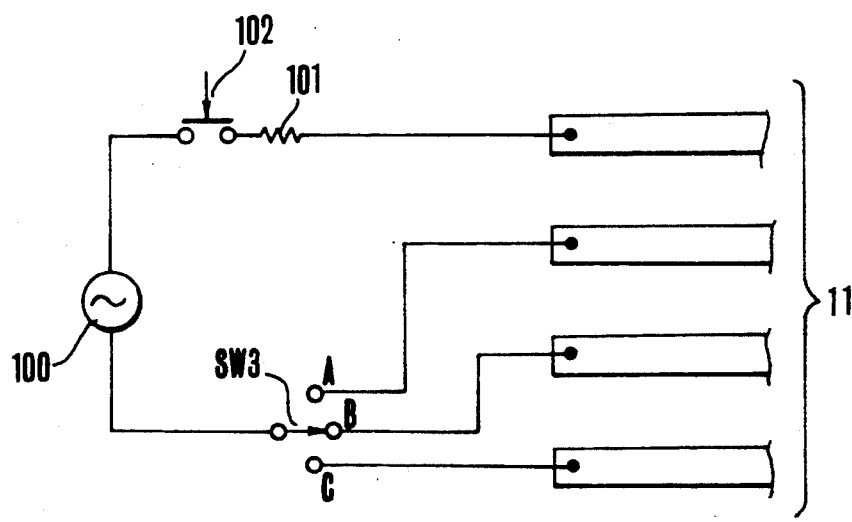

FIGS. 13(A) and 13(B) show arrangements for changing the reluctance of the magnetic shield layer 10 shown in FIG. 8. Four lines on the right side of each of these drawings represent the first lines 11 of FIG. 8.

In FIGS. 13(A) and 13(B), a reference numeral 100 denotes an AC power supply; a numeral 101 a resistor; a numeral 102 a power switch; and reference symbols SW1, SW2 and SW3 respectively denote change-over switches. The upper part of each of these drawings represents the line disposed on the side of the magnetic gap of the magnetic head shown in FIG. 8. The arrangement shown in FIG. 13(A) is as follows: In a case where the second lines 12 are to be cut between the first and the second of the first lines 11 as viewed from the magnetic gap, the switches SW1 and SW2 are respectively connected to their terminals A and then the power switch 102 is turned on. If the second lines 12 are to be cut between the second and the third of the first lines 11 for further reduction in the magnetic reluctance, the switches SW1 and SW2 are connected to their terminals B and then the power switch 102 is turned on. If the second lines 11 are to be cut between the third and the fourth of the first lines 11 for still further reduction of the magnetic reluctance, the switches SW1 and SW2 are connected to their terminals C and then the power switch 102 is turned on.

The arrangement shown in FIG. 13(B) is advantageous in cases where a necessary amount of magnetic reluctance is predetermined. In a case where the reluctance is desired to be vary small, the switch SW3 is connected to its terminal C and, after that, the power switch 102 is turned on. As a result, all the second lines 12 located between the first and the fourth of the first lines 11, as viewed from the magnetic gap, are cut off to give a vary small amount of magnetic reluctance. To reduce the reluctance to a slight degree, the switch SW3 is connected to its terminal A and then the power switch 102 is turned on. This causes the second lines 12 to be cut only between the first and the second of the first lines 11.

In the cases of FIGS. 13(A) and 13(B), the magnetic reluctance of the magnetic shield layer is adjustable to a suitable degree by suitably selecting the connection terminals of the switches SW1, SW2 and SW3 before the power switch 102 is turned on as described above. This effectively lessens the crosstalk.

As apparent from the foregoing description, in the thin-film magnetic head of the kind having a magnetic circuit which consists of an upper magnetic layer and a lower magnetic layer and a coil which is made of a conductive layer disposed on a substrate in each of channels with the lower magnetic layer provided in common for all the channels, a magnetic shield layer is arranged, according to this invention, over the upper magnetic layers in such a manner that the intensity of magnetic reluctance due to its magnetic shielding action is adequately adjustable. The invented arrangement thus effectively prevents a crosstalk; enhances the efficiency of reproduction; gives a large reproduction output; and enhances productivity by permitting simplification of manufacturing processes.

What is claimed is:

1. A thin-film magnetic head comprising:
   a) a magnetic circuit part which is composed of an upper magnetic layer, a lower magnetic layer and a magnetic gap;
   b) a coil which is made of electrically conductive material and is disposed between said upper and lower magnetic layers; and
   c) a magnetic shield layer which is disposed on said upper magnetic layer and is made of electrically conductive material, the amount of the magnetic reluctance of said magnetic shield layer being externally adjustable.

2. A magnetic head according to claim 1, wherein said magnetic shield layer includes a plurality of first conductive lines which are arranged in rows in the direction of the track width of said magnetic gap and a plurality of second conductive lines which have smaller sectional areas than said first conductive lines and are arranged to intersect said first conductive lines.

3. A magnetic head according to claim 2, wherein said plurality of first conductive lines include at least three parallel lines, and wherein a voltage is arranged to be applied to two lines selected from said plurality of first conductive lines.

4. A magnetic head according to claim 1, wherein said magnetic shield layer includes a plurality of conductive layers, each of which is composed of a plurality of first conductive lines which are arranged in rows in the direction of the track width of said magnetic gap and a plurality of second conductive lines which are arranged to intersect said plurality of first lines, and wherein a voltage is arranged to be applied to a layer selected from said plurality of conductive layers.

5. A thin-film magnetic head comprising:
   a) a magnetic circuit part composed of an upper magnetic layer, a lower magnetic layer and a magnetic gap;
   b) a coil disposed between said upper and lower magnetic layers and made of electrically conductive material; and
   c) a magnetic shield layer disposed on said upper magnetic layer, said magnetic shield layer including an electrically conductive part which is formed in a lattice-like shape.

6. A magnetic head according to claim 5, wherein said conductive part includes a plurality of first lines which are arranged in rows in the direction of the track width of said magnetic gape and a plurality of second lines which are arranged to intersect said plurality of first lines.

7. A magnetic head according to claim 6, wherein sectional areas of said plurality of second lines are smaller than those of said plurality of first lines.

8. A magnetic head according to claim 7, wherein said plurality of first lines include at least three parallel lines.

9. A magnetic head according to claim 8, wherein said plurality of first lines and said plurality of second lines are formed on one and the same plane.

10. A magnetic head according to claim 8, wherein said plurality of first lines are formed on said plurality of second lines.

11. A magnetic head according to claim 7, wherein said conductive part includes a plurality of conductive layers, each of which is composed of a plurality of first lines which are arranged in rows in the direction of the track width of said magnetic gap and a plurality of second lines which are arranged to intersect said first lines.

12. A thin-film magnetic head comprising:
a) a plurality of magnetic circuit parts, each of which is composed of an upper magnetic layer, a lower magnetic layer and a magnetic gap, said lower magnetic layer being provided in common for all said plurality of magnetic circuit parts;
b) coils each of which is made of electrically conductive material and is disposed between said upper and lower magnetic layers in each of said plurality of magnetic circuit parts; and
c) a magnetic shield layer disposed on said upper magnetic layer of each of said plurality of magnetic circuit parts, said magnetic shield layer being made of electrically conductive material and having the amount of the magnetic reluctance externally adjustable.

13. A magnetic head according to claim 12, wherein said magnetic shield layer includes a plurality of first conductive lines which are arranged in rows in the direction of the track width of said magnetic gap and a plurality of second conductive lines which have smaller sectional areas than said first conductive lines and are arranged to intersect said first conductive lines.

14. A magnetic head according to claim 13, wherein said plurality of first conductive lines are formed to straddle over said upper magnetic layers of said plurality of magnetic circuit parts.

15. A thin-film magnetic head comprising:
a) a plurality of magnetic circuit parts, each of which is composed of an upper magnetic layer, a lower magnetic layer and a magnetic gap, said lower magnetic layer being provided in common for all said plurality of magnetic circuit parts;
b) coils, each of which is made of a conductive material and is disposed between said upper and lower magnetic layers in each of said plurality of magnetic circuit parts; and
c) a magnetic shield layer disposed on said upper magnetic layer of each of said plurality of magnetic circuit parts, said magnetic shield layer including an electrically conductive part which is formed in a lattice-like shape.

16. A magnetic head according to claim 15, wherein said magnetic shield layer includes a plurality of first conductive lines which are arranged in rows in the direction of the track width of said magnetic gap and a plurality of second conductive lines which have sectional areas smaller than said first conductive lines and are arranged to intersect said first conductive lines.

17. A magnetic head according to claim 16, wherein said plurality of first conductive lines are formed to straddle over said upper magnetic layers of said plurality of magnetic circuit parts.

* * * * *